C. A. TOWER.
FRICTION DRAFT RIGGING.
APPLICATION FILED OCT. 8, 1906.

923,735.

Patented June 1, 1909.

WITNESSES
R. H. Balderson
W. W. Swartz

INVENTOR
Clinton A. Tower,
by Bakewell & Byrnes,
his Attys.

UNITED STATES PATENT OFFICE.

CLINTON A. TOWER, OF CLEVELAND, OHIO, ASSIGNOR TO THE NATIONAL MALLEABLE CASTINGS COMPANY, OF CLEVELAND, OHIO, A CORPORATION OF OHIO.

FRICTION DRAFT-RIGGING.

No. 923,735.   Specification of Letters Patent.   Patented June 1, 1909.

Application filed October 8, 1906. Serial No. 337,901.

*To all whom it may concern:*

Be it known that I, CLINTON A. TOWER, of Cleveland, Cuyahoga county, Ohio, have invented a new and useful Friction Draft-Rigging, of which the following is a full, clear, and exact description, reference being had to the accompanying drawings, forming part of this specification, in which—

Figure 1:
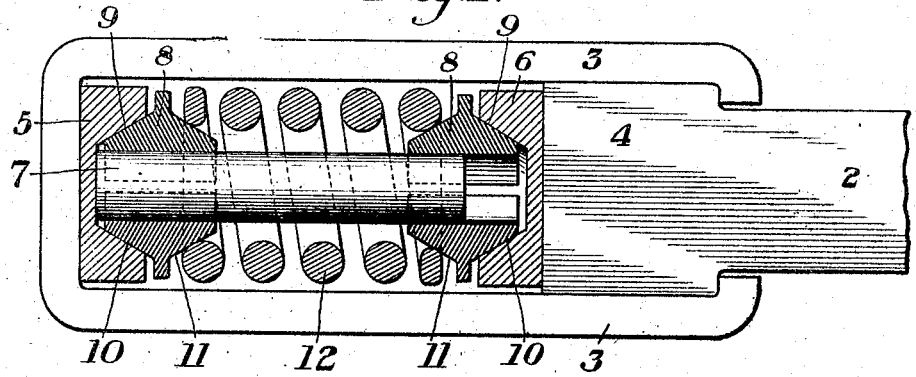
Figure 2:
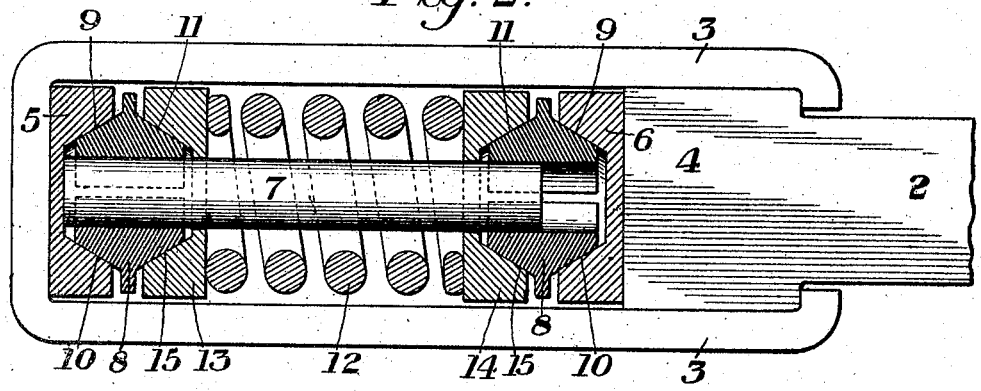
Figure 3:
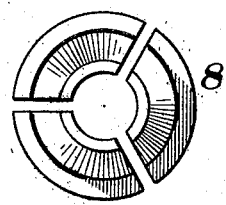

Figure 1 is a longitudinal sectional view showing the draft rigging; Fig. 2 is a similar view showing a modification; and Fig. 3 is a detail view of the wedge or friction members.

My invention has relation to the class of friction draft riggings, and is designed to provide a simple and efficient draft rigging of this character in which the parts are compactly arranged; and the invention consists in the novel construction and arrangement and combination of parts all substantially as hereinafter described and pointed out in the appended claims.

Referring first to the construction shown in Fig. 1, the numeral 2 designates the draw bar, 3 the usual yoke which extends rearwardly from the draw bar and which engages the head 4 thereof. 5 and 6 are end followers, the follower 5 being seated against the back end of the yoke 3, while the follower 6 is seated against the end of the head 4 of the draw bar. 7 designates a central friction member which in the form here shown consists of a cylindrical rod whose length is such that it will afford an intermediate clearance between its ends and the followers 5 and 6, as shown in the drawings. Slidingly seated upon each end portion of this rod are a set of friction or wedge members 8 having conical surfaces 9 which engage the walls of corresponding cavities 10 in the respective followers 5 and 6. Each set of the friction or wedge members also has opposite cone faces 11 which form seats for the ends of a spiral spring 12 which is seated around the central member 7. In the form shown each set of wedge or friction members is formed in three separate pieces, as mc.e clearly shown in Fig. 3.

The form shown in Fig. 2 is similar to that shown in Fig. 1 with the exception that instead of seating the ends of the spring 12 directly against the wedge or friction members, two additional followers 13 and 14 are interposed respectively between the ends of the spring and the adjacent set of friction members, these followers having conical cavities 15 thereon which engage the cone faces 11 of the friction members.

It will be readily seen that under either pulling or buffing stress, the spring 12 will be compressed, thereby forcing the friction members or wedges into contact with the followers and into frictional engagement with the central rod or member 7, this friction increasing with the increasing stress. During pulling, the clearance space at the end of the central friction member permits longitudinal motion of the parts, for if the parts are in the position shown in Fig. 1, the follower 5 will engage the end of the central member 7, and will move it longitudinally toward the follower 6, and in buffing the clearance space at the end will likewise permit motion of the follower 6, either with or toward the end of the central member 7 accordingly as said member is then abutting against the follower or not.

The advantages of my invention will be appreciated by those skilled in the art. The arrangement and manner of action of the friction members is a very positive and effective one, and takes up so little room that it can be readily applied in all cases where draft riggings of the kind now commonly employed are applicable without change in the arrangement of the draft timbers.

The invention may be modified in many ways without departing from the spirit and scope of my invention as defined in the claims.

What I claim is:—

1. In a frictional draft-rigging, end followers, a central friction member interposed between the followers and having end clearance, friction members loosely seated on the end portions of the central member and engaging the followers, and a spring for forcing the members into engagement, said central member being longitudinally movable with the respective followers and adapted when moved to move in the same direction with the moving followers; substantially as described.

2. A friction draft-rigging having end followers formed with inclined surfaces, friction members engaging each of said followers, a central friction member carrying the said friction member and interposed between the followers and having end clearance, said central member being longitudinally movable with the respective followers and adapted when moved to move in the same direction with the moving follower, and a spring exerting pressure against the friction members; substantially as described.

In testimony whereof, I have hereunto set my hand.

CLINTON A. TOWER.

Witnesses:
HARRY E. ORR,
HENRY F. POPE.